(12) United States Patent
Witz et al.

(10) Patent No.: US 9,034,446 B2
(45) Date of Patent: May 19, 2015

(54) PREFORM SUITABLE FOR BLOW-MOLDING INTO A FINAL SHAPED CONTAINER

(75) Inventors: Jean-Christophe Witz, Yutz (FR); Laurent Christel Sigler, Hettange-Grande (FR); Rainer Kintzinger, Merzig (DE); Ralf Walter Fisch, Saarburg (DE); Adeline Houssaye, Noisy-le-Grand (FR)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 272 days.

(21) Appl. No.: 13/578,136

(22) PCT Filed: Jan. 20, 2011

(86) PCT No.: PCT/CA2011/050028
§ 371 (c)(1),
(2), (4) Date: Aug. 9, 2012

(87) PCT Pub. No.: WO2011/103677
PCT Pub. Date: Sep. 1, 2011

(65) Prior Publication Data
US 2012/0308841 A1  Dec. 6, 2012

Related U.S. Application Data

(60) Provisional application No. 61/308,491, filed on Feb. 26, 2010.

(51) Int. Cl.
*B32B 1/02*  (2006.01)
*B29B 11/14*  (2006.01)
(Continued)

(52) U.S. Cl.
CPC ............. *B29B 11/14* (2013.01); *B29C 49/0073* (2013.01); *B29B 11/08* (2013.01);
(Continued)

(58) Field of Classification Search
CPC ........ B32B 1/02; B32B 9/00; B29B 2911/14; B29B 11/14; G06F 17/50; Y10T 428/1352
USPC .............................................. 428/35.7, 542.8
See application file for complete search history.

(56) References Cited

U.S. PATENT DOCUMENTS

| 3,690,798 A | 9/1972 | Brukovsky et al. |
| 4,005,245 A | 1/1977 | Edwards |

(Continued)

FOREIGN PATENT DOCUMENTS

| EP | 0277557 A2 | 8/1988 |
| EP | 0391817 A1 | 10/1990 |

(Continued)

OTHER PUBLICATIONS

PCT International Search Report, Julien Daigle, Mar. 24, 2011, 3 pages.

(Continued)

*Primary Examiner* — Erik Kashnikow

(57) ABSTRACT

A preform (200, 300, 400, 500, 800a, 800b, 900, 1000) suitable for blow-molding into a final-shaped article is provided. The preform (200, 300, 400, 5000, 800a, 800b) comprises a neck portion (202, 302, 402, 502); a gate portion (206, 306, 406, 506); and a body portion (204, 304, 404, 504) extending between the gate portion (206, 306, 406, 506) and the neck portion (202, 302, 402, 502); the body portion (204, 304, 404, 504) defining: a first portion (210, 310, 410, 510, 810), a second portion (212, 312, 412, 512, 812) and a third portion (214, 314, 414, 514, 814), the second portion being disposed in-between the first portion and the third portion located in sequence along one of: (i) substantially the whole circumference of the body portion and (ii) substantially the whole length of the body portion; one of the first portion, second portion and the third portion having a stretch ratio different that at least one of the other ones of the first portion, the second portion and the third portion.

3 Claims, 10 Drawing Sheets

(51) Int. Cl.
  *B29C 49/00* (2006.01)
  *B29B 11/08* (2006.01)
  *B29C 49/06* (2006.01)
  *B29K 105/00* (2006.01)

(52) U.S. Cl.
  CPC .................... *B29B2911/1402* (2013.01); *B29B 2911/14026* (2013.01); *B29B 2911/14033* (2013.01); *B29B 2911/1404* (2013.01); *B29B 2911/14106* (2013.01); *B29B 2911/14133* (2013.01); *B29B 2911/14326* (2013.01); *B29B 2911/14333* (2013.01); *B29B 2911/1444* (2013.01); *B29B 2911/14466* (2013.01); *B29B 2911/1448* (2013.01); *B29B 2911/14486* (2013.01); *B29C 49/06* (2013.01); *B29K 2105/258* (2013.01); *B29B 2911/14393* (2013.01)

(56) References Cited

U.S. PATENT DOCUMENTS

| | | | |
|---|---|---|---|
| 4,603,831 A | | 8/1986 | Krishnakumar et al. |
| 4,649,068 A | | 3/1987 | Collette |
| 4,785,948 A | * | 11/1988 | Strassheimer ................ 215/373 |
| 4,885,197 A | * | 12/1989 | Strassheimer ............. 428/36.92 |
| 5,330,342 A | | 7/1994 | Linss et al. |
| 5,366,774 A | | 11/1994 | Pinto et al. |
| 5,455,088 A | | 10/1995 | Deemer |
| 6,896,943 B1 | | 5/2005 | Beale |
| 7,402,333 B2 | | 7/2008 | Nakamura et al. |
| 2005/0033562 A1 | | 2/2005 | Narushima et al. |
| 2005/0255269 A1 | | 11/2005 | Jacobs |
| 2007/0292642 A1 | * | 12/2007 | Ungrady et al. ............. 428/35.7 |
| 2013/0134124 A1 | | 5/2013 | Bazlur et al. |

FOREIGN PATENT DOCUMENTS

| | | |
|---|---|---|
| EP | 1366887 A1 | 12/2003 |
| WO | 9721533 A1 | 6/1997 |
| WO | 03/055663 A1 | 7/2003 |
| WO | 2007083266 A1 | 7/2007 |
| WO | 2011103677 A1 | 9/2011 |

OTHER PUBLICATIONS

European Search Report, Tomas Ingelgard, Sep. 10, 2014, 5 pages.

* cited by examiner

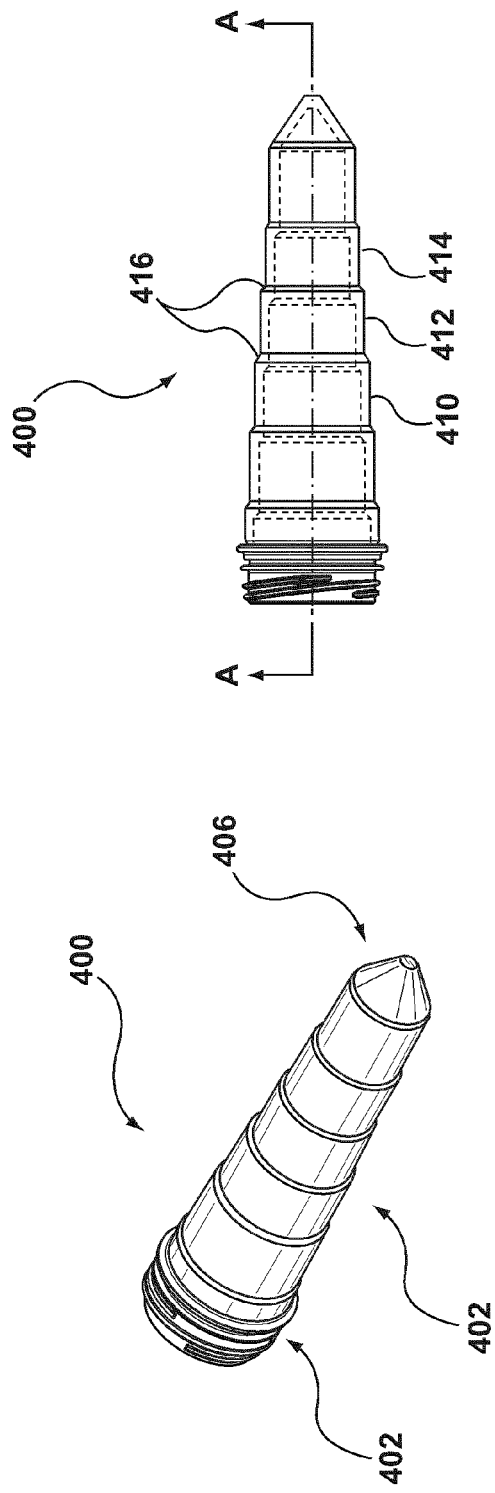
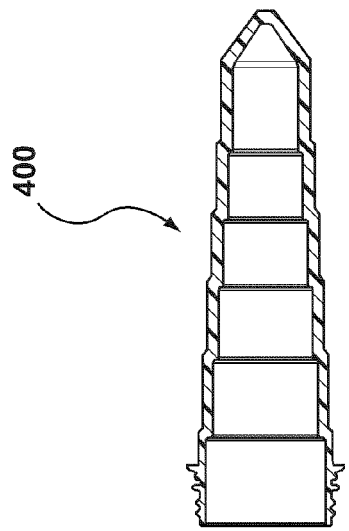
FIG. 4B
FIG. 4C
FIG. 4A

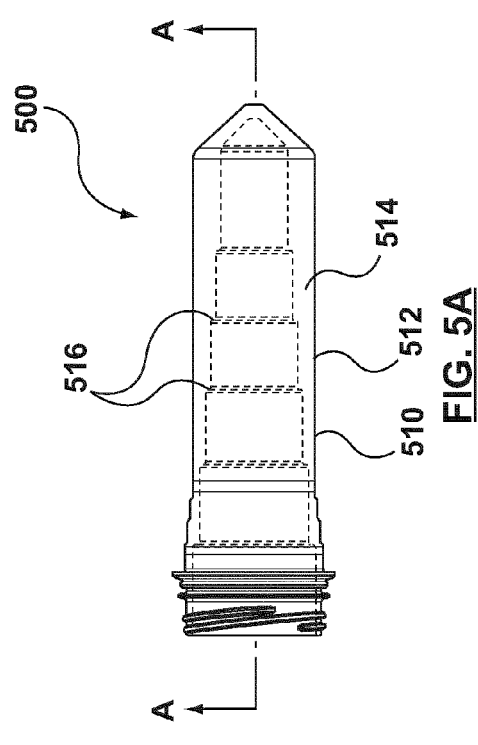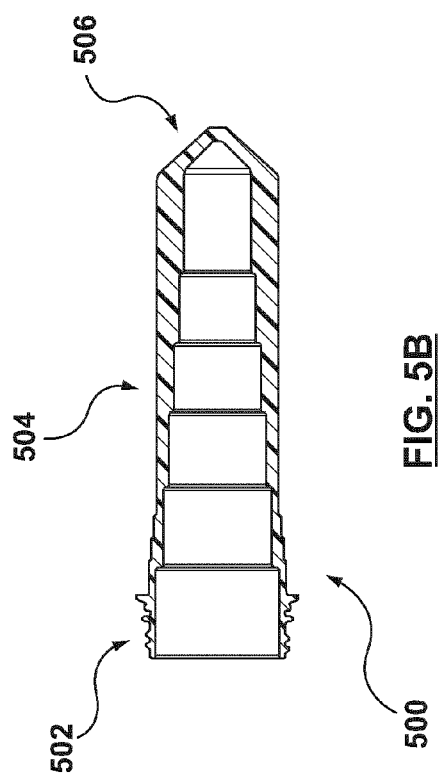
FIG. 5A
FIG. 5B

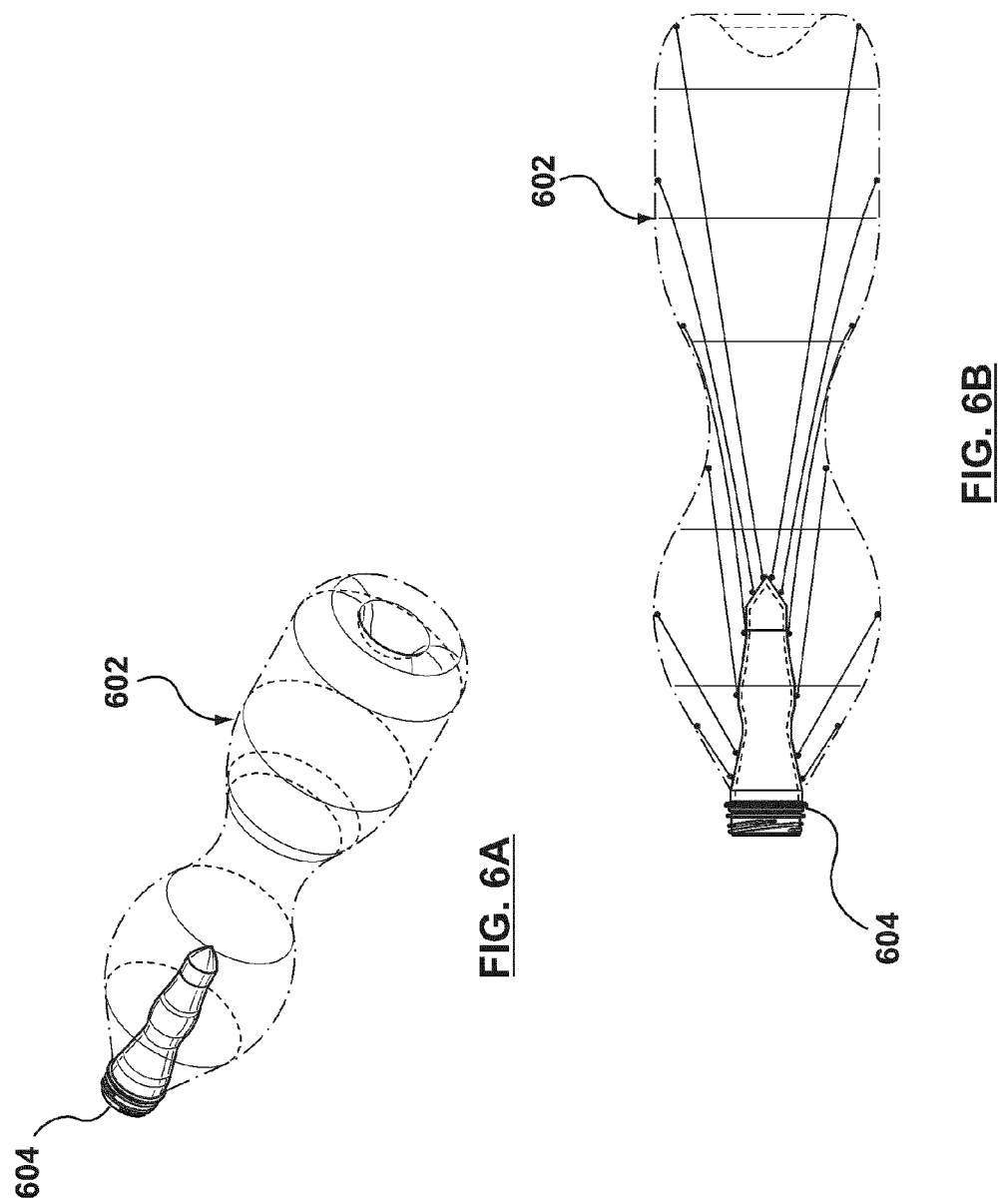

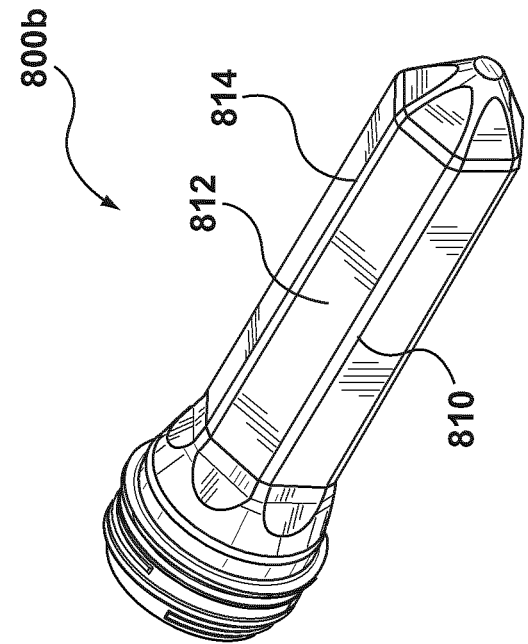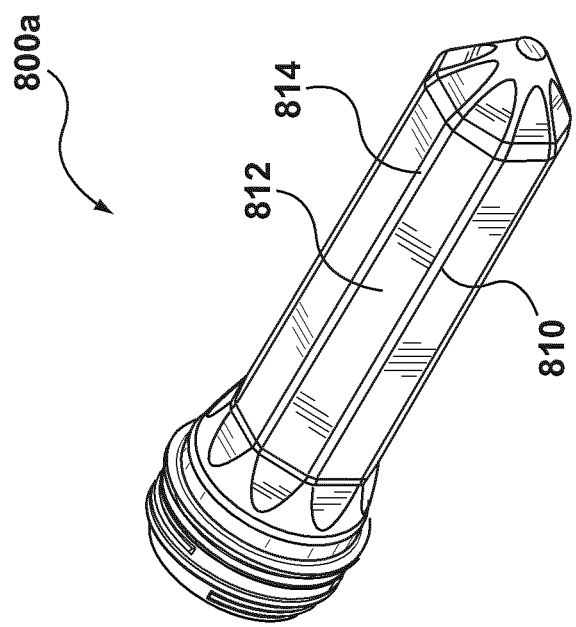
FIG. 8

PREFORM SUITABLE FOR BLOW-MOLDING INTO A FINAL SHAPED CONTAINER

FIELD OF THE INVENTION

The present invention generally relates to, but is not limited to, a molding systems and processes, and more specifically the present invention relates to, but is not limited to, a preform suitable for blow-molding into a final shaped container.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

As an illustration, injection molding of PET material involves heating the PET material (ex. PET pellets or the like) to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Thereafter, the molded article can be ejected off of the core piece by use of one or more ejection structure. Ejection structures are known to assist in removing the molded articles from the core halves. Examples of the ejection structures include stripper plates, stripper rings and neck rings, ejector pins, etc.

With reference to FIG. 1, a preform 100 is depicted, the preform 100 being an example of a typical prior art preform. The preform 100 consists of a neck portion 102, a gate portion 106 and a body portion 104 extending between the neck portion 102 and the gate portion 106.

The preform 100 has a number of additional structural features that fulfill one or more functions. For example, within the neck portion 102, there is provided a thread 108. The purpose for the thread 108 is to cooperate with a complementary thread of a closure device (not depicted) to cap the final-shaped container that is produced from the preform 100, such that to maintain a substance (such as a beverage and the like) contained within a final-shaped container produced from the preform 100 (when such a final-shaped container is blow-molded and eventually filled with the substance). Furthermore, the neck portion 102 comprises a support ledge 112. The support ledge 112 performs multiple functions including, but not limited to, cooperating with various handling devices and structures during injection molding and blow molding stages of production of the preform 100 (for example, cooperation with guiding rails) and the final-shaped container from the preform 100 (for example, cooperation with the blow-molding equipment to provide sealing, etc.).

It is generally known to produce the preform 100 and to subsequently blow-mold it into a final shaped container, such as a bottle for a beverage and the like. It can be appreciated from the illustration of FIG. 1, that the body portion 104 and almost substantially the whole of the gate portion 106 are associated with substantially constant wall thickness. It is, however, known in the art to implement preforms having a varying wall thickness.

For example, U.S. Pat. No. 3,690,798 discloses a variable orifice extruder head for extruding parisons whose wall thickness may be varied over the length of the parison. The extruder head comprises a die assembly movable with respect to a fixed mandrel for varying the die assembly orifice. The die assembly is supported by suspension rods from a fixed housing through which the mandrel passes and in relation to which the mandrel is also fixed. The suspension rods are threaded at their upper ends and have spur gears threaded thereon. An internal ring gear engages each of the spur gears in such manner that rotation of the ring gear causes rotation of the spur gears thereby to raise or lower the die assembly.

Japanese patent 59004292 teaches a preform having a varying wall thickness.

U.S. Pat. No. 4,885,197 teaches a plastic preform for forming blow molded plastic containers wherein the inside wall face of the tubular body portion adjacent the bottom structure and extending onto the bottom structure has a plurality of flat faces with terminal portions thereof. Scallop-shaped segments are provided connecting the terminal portions of each flat face to initiate deformation prior to deformation of the flat faces and thereby have an increased rate and degree of orientation.

U.S. Pat. No. 4,649,068 issued to Collette on Mar. 10, 1987 discloses a preform which is injection molded and which is especially intended for use in the blow molding of a container suitable for receiving a hot fill product. Most particularly, the neck finish of the preform, which becomes the neck finish of the resultant blow molded container, is reinforced against axial compression or foreshortening as may occur when the neck finish is heated to a temperature approaching the glass transition temperature of the polyester from which the neck finish is formed. So as to resist deformation of the neck finish, the neck finish is provided on the interior surface (mouth) thereof with a plurality of axially extending, radially inwardly projecting, circumferentially spaced ribs. If the thread means of the neck finish for receiving a closure is of the interrupted type, there will be at least one rib for each thread element.

U.S. Pat. No. 4,005,245 issued to Edwards on Jan. 25, 1977 discloses plastic preforms adapted for telescopic association with a complementary smooth surfaced mandrel such as is used in conventional plastic blow molding machines. More particularly, the present invention contemplates a novel type of plastic preform as herein, which comprises an elongate hollow plastic member, the inner surface of which in the aggregate conforms generally with the shape defined by the smooth peripheral surface of a complementary mandrel. The inner peripheral surface of the hollow plastic member or preform below the rim portion presents a plurality of circumferentially spaced surface portions adapted for initial direct impingement with restricted areas of the peripheral surface of a complementary smooth surfaced mandrel, the spacing between the said surface areas of impingement providing passageways extending generally longitudinally throughout substantially the entire longitudinal extent of the plastic member. The inner rim portion is devoid of such surface areas of impingement for air sealing the preform on the mandrel.

U.S. Pat. No. 5,455,088 issued to Deemer on Oct. 3, 1995 discloses a plastic bottle having a neck portion defining an opening, a generally tubular bottle body portion depending from the neck portion, and an integral bottle bottom structure closing a lowermost end of the bottle body portion including a continuous standing ring circumscribing a central push-up region is blow molded from a preform which includes a generally tubular preform body portion having an outside wall face and an inside wall face and an integral preform bottom structure closing a lowermost end of the preform. The preform body includes a cylindrical thickened portion which upon blowing forms said continuous standing ring. The central push-up region of the plastic bottle is formed from that portion of the preform below the cylindrical thickened portion. The portion of the preform below the cylindrical thickened portion includes features contributing to enhanced bottle bottom strength while minimizing the amount of resin employed in the structure.

U.S. Pat. No. 4,603,831 issued to Krishnakumar et al. on Aug. 5, 1986 discloses a method and apparatus for the forming of a champagne bottom plastic bottle wherein the bottom is reinforced by internal radiating ribs which are formed by solid material. The bottle is formed in the customary manner by utilizing a preform which has molded on the inner surface thereof longitudinal ribs. The preform is formed by conventional injection molding equipment which has been modified only to form along the lower part of the customary core member longitudinally extending rib forming grooves.

U.S. Pat. No. 5,366,774 issued to Pinto et al. on Nov. 22, 1994 discloses a tubular preform for a blow-molded container. The preform has a closed end and an opposite open end, the relative dimensions of the ends being such that the closed end would be receivable in the open end of a similar preform to nest there were it not for the provision of an antinesting feature in the form of a plurality of axially extending ribs which protrude inwardly from the inner surface of the preform adjacent to the open end to prevent entry of another preform.

PCT patent publication 2007/083266 by Pagliacci published on Jul. 26, 2007 discloses a disposable container, of the type wherein at least part of the lateral surface of the container (1) consists of a bellow-shaped structure comprising a plurality of adjacent folds joined by internal (2) and external (3) hinge bands, respectively. At least the internal hinge bands (2) have, in a cross-section, a lobed structure comprising mutually alternate ridges (4) and valleys (5) which are continuously joined, the ridges and the valleys of one of said internal hinge bands (2) being offset, in the projection on a perpendicular plane to the container axis (A), with respect to the ridges and valleys of the immediately surrounding internal hinge bands. In correspondence of said ridges there are further provided shape stiffening areas (6) of the bottle wall. Each of said stiffening areas (6) is joined to the surrounding stiffening areas by slanting ribs (8).

SUMMARY OF THE INVENTION

According to a first broad aspect of the present invention, there is provided a preform suitable for blow-molding into a final-shaped article. The preform comprises a neck portion; a gate portion; and a body portion extending between the gate portion and the neck portion. The body portion defines a first portion, a second portion and a third portion, the second portion being disposed in-between the first portion and the third portion located in sequence along one of: (i) at least a portion of a circumference of the body portion and (ii) at least a portion of the length of the body portion; all three portions having substantially the same wall thickness; the second portion being implemented as a high-stretch ratio region associated with a different stretch ratio coefficient relative to the first and third portions.

According to a second broad aspect of the present invention, there is provided preform suitable for blow-molding into a final-shaped article. The preform comprises a neck portion; a gate portion; and a body portion extending between the gate portion and the neck portion; the body portion defining: a first portion, a second portion and a third portion, located sequentially one after another along at least a portion of the length of the body portion, each separated by a respective step; the three portions being associated with one of (a) progressively increasing stretch ratio coefficient and (b) progressively decreasing stretch ratio coefficient.

According to a third broad aspect of the present invention, there is provided a method of design a preform. The method comprises uploading a design of a final shaped container to be molded from the preform; selecting a plurality of reference points on the final shaped container; applying the same stretch ratio to the plurality of reference points to render a plurality of preform reference points; based on the plurality of preform reference points, rendering a preform design for the preform.

According to another broad aspect of the present invention, there is provided a preform suitable for blow-molding into a final-shaped article. The preform comprises a neck portion; a gate portion; and a body portion extending between the gate portion and the neck portion; the body portion defining: a first portion, a second portion and a third portion, the second portion being disposed in-between the first portion and the third portion located in sequence along one of: (i) substantially the whole circumference of the body portion and (ii) substantially the whole length of the body portion; one of the first portion, second portion and the third portion having a stretch ratio different that at least one of the other ones of the first portion, the second portion and the third portion.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention (including alternatives and/or variations thereof) may be obtained with reference to the detailed description of the embodiments along with the following drawings, in which:

FIG. 3A depicts a perspective view of a preform implemented in accordance with another non-limiting embodiment of the present invention, while

FIG. 4A depicts a perspective view of a preform, the preform being implemented in accordance with another non-limiting embodiment of the present invention, FIG. 4B depicts a side view of the preform with certain features shown in phantom lines and FIG. 4C depicts a cross sectional view of the preform taken along lines A-A of FIG. 4B.

FIG. 5A depicts a side view of a preform with certain hidden features shown in phantom lines, the preform being implemented in accordance with yet another non-limiting embodiment of the present invention and FIG. 5B depicts a cross sectional view of the preform taken along lines A-A of FIG. 5A.

FIGS. 6A and 6B schematically illustrate images of the final shaped container and the preform design rendered while executing non-limiting embodiments of a method for designing a preform.

FIG. 8 a perspective view of two preforms, both implemented in accordance with yet other alternative non-limiting embodiments of the present invention

The drawings are not necessarily to scale and are may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 2B:
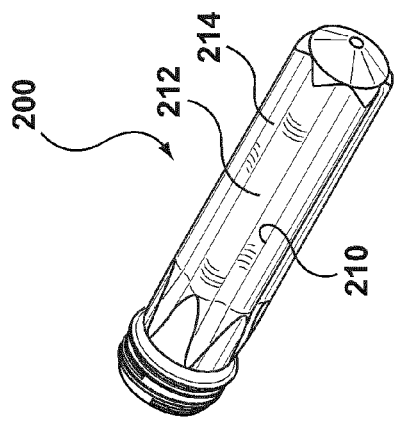
FIG. 2B depicts a perspective view of the preform and FIG. 2C depicts a cross sectional view of the preform taken along lines A-A of FIG. 2A.
Figure 2A:
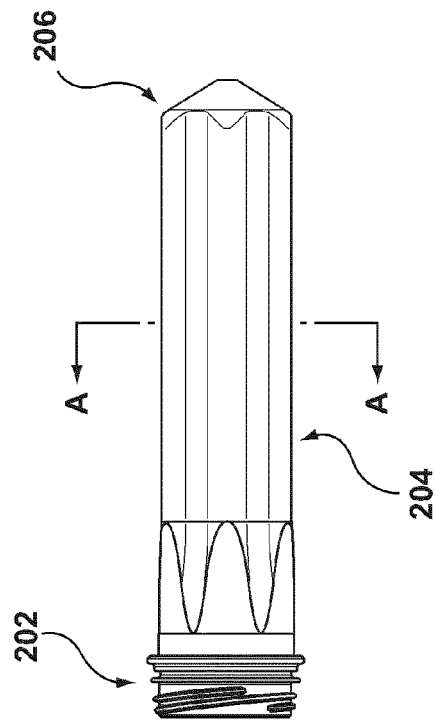
FIG. 2A depicts a side view of a preform implemented in accordance with a non-limiting embodiment of the present invention.
Figure 2C:
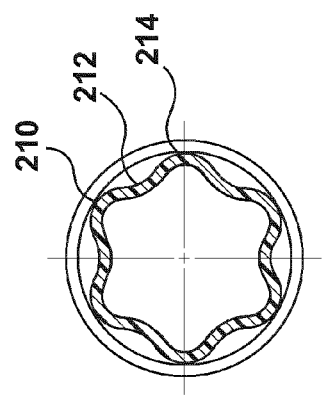

With reference to FIGS. 2A, 2B and 2C, there is depicted a preform 200 implemented in accordance with a first non-limiting embodiment of the present invention. More specifically, FIG. 2A depicts a side view of the preform 200, FIG. 2B depicts a perspective view of the preform 200 and FIG. 2C depicts a cross sectional view of the preform 200 taken along lines A-A of FIG. 2A.

Figure 1:
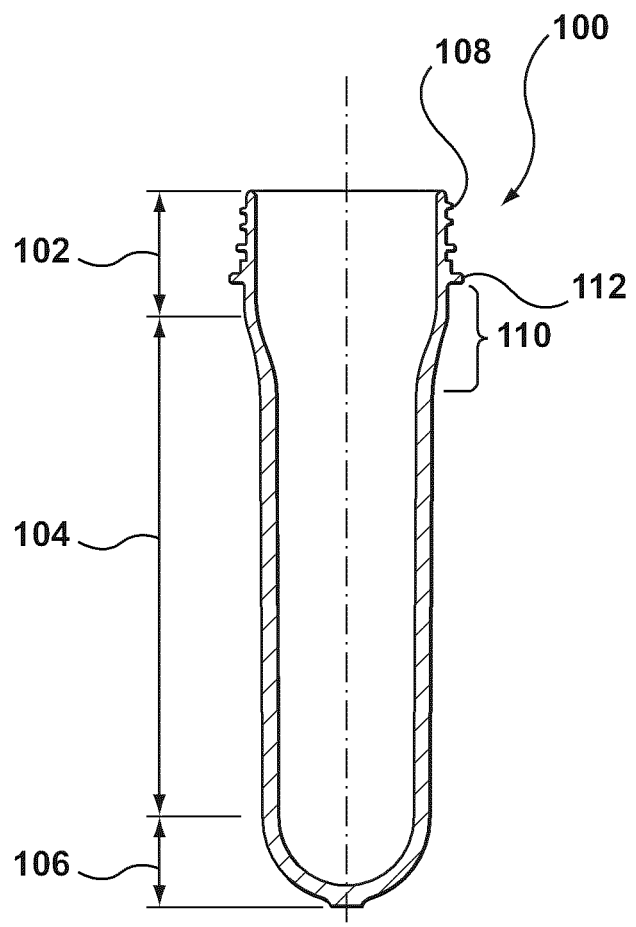
FIG. 1 depicts a preform implemented in accordance with prior art teachings.

The preform 200 is suitable for blow-molding into a final-shaped container, such as a bottle for a beverage or the like. For the purposes of the description to be presented herein below, the final-shaped container (such as the bottle for beverage) is of various standard designs currently commercially available on the market. Non-limiting examples of such containers are described in FIG. 1 of US patent application 2009/0293437 published to Schultz et al on Dec. 3, 2009; FIG. 3 of U.S. Pat. No. 5,603,423 issued to Lynn et al on Feb. 18, 1997 and in U.S. Pat. No. 5,067,622 issued to Garver et al on Nov. 26, 1991. Naturally, many more designs of standard final-shaped containers are possible.

The preform 200 consists of a neck portion 202, a gate portion 206 and a body portion 204 extending between the neck portion 202 and the gate portion 206.

Within these embodiments, the body portion 204 can be said to define a first portion 210, a second portion 212 and a third portion 214. As can be appreciated from FIGS. 2A, 2B and 2C, the first portion 210, the second portion 212 and the third portion 214 are disposed sequentially one after another along a circumference (not separately numbered) of the body portion 204. Put another way, the second portion 212 is disposed in-between (or intermeshed) the first portion 210 and the third portion 214. It can be also appreciated from the illustration of FIGS. 2A, 2B and 2C, that all of the first portion 210, the second portion 212 and the third portion 214 are associated with a substantially same wall thickness (i.e. a thickness of material between an outer skin and an inner skin of the body 204).

According to embodiments of the present invention, the second portion 212 can be implemented as a high-stretch ratio region associated with a different stretch ratio coefficient relative to the first portion 210 and the third portion 214. It is noted that within these embodiments of the present invention, the first portion 210 and the third portion 214 are associated with substantially the same stretch ratio. Recalling that the body portion 204, including the first portion 210, the second portion 212 and the third portion 214, is associated with substantially the same wall thickness, the difference in the stretch ratio is achieved by geometry and positioning of the first portion 210, the second portion 212 and the third portion 214. More specifically, the geometry of the body portion 204 can be said to be associated with a crenated shape in the sense that it is comprised of intermeshed peaks (i.e. the first portion 210 and the third portion 214) and valleys (the second portion 212). Even more specifically, the second portion 212 will travel a longer distance during stretch-blow molding compared to the first portion 210 and the second portion 214. For the avoidance of doubt, the term stretch ratio is used in the sense of stretch ratio as it may apply during the stretch-blow molding process, for example, where the preform 200 is re-shaped into the final shaped container.

As can be appreciated from the illustration of FIGS. 2A, 2B and 2C, the gate portion 206 is implemented in a shape of a cone, but this needs not be so in every embodiment of the present invention. In alternative implementations of the embodiments of the present invention, the gate portion 206 can be implemented in a different shape, such as a typical semi-spherical shape or the like. The exact implementation of the neck portion 202 is not particularly limited and can be based on one of the standards available in the art and will depend on the specific design of the closure (not depicted) used to cap the final-shaped container, as well as certain constraints imposed by the blow-molding equipment (specifically applicable to the design of the support ledge, which is not separately numbered).

As can be clearly appreciated from the illustration of FIG. 2B and FIG. 2C, the first portion 210, the second portion 212 and the third portion 214 are implemented repeatedly in sequence along the whole of the circumference of the body portion 204. It is noted that the exact number of occurrences of the first portion 210, the second portion 212 and the third portion 214 is not limited and will depend on specific design choices, such as the size of the preform 200, the specific shape selected for implementing the first portion 210, the second portion 212 and the third portion 214 and other design considerations.

It is noted that during the axial deformation during the stretch blow molding of the preform 200, the second portion 212 will result in more material defined on the final-shaped container, while the first portion 210 and the third portion 214 will result in less material defined on the final-shaped container. This, in turn, results in the portions of the final-shaped container defined by the first portion 210 and the third portion 214 being associated with higher strain rate and, therefore, higher strength.

It is also noted that the specific shape of the first portion 210, the second portion 212 and the third portion 214 is not particularly limited and may be selected based on specific differences between respective stretch ratios as may be desired. For example, even though depicted in FIG. 2C as a general sinusoidal shape, this needs not be so in every embodiment of the present invention. Furthermore, the specific depth of the peaks valleys, particular radii and the like can be varied in different implementations of the embodiments of the present invention.

For example, an alternative implementation for the shape of the preform 200 is depicted with reference to FIG. 8, which depicts a perspective view of a preform 800a and a preform 800b, both implemented in accordance with other non-limiting embodiments of the present invention. Preform 800a can be thought of as a "octagon shaped preform" and the preform 800b can be though of as a "hexagon shaped preform".

Similarly to the preform 200 described above, each of the preform 800a and the preform 800b also defines a first portion 810, a second portion 812 and a third portion 814. According to embodiments of the present invention, the second portion 812 can be implemented as a high-stretch ratio region associated with a different stretch ratio coefficient relative to the first portion 810 and the third portion 814. It is noted that within these embodiments of the present invention, the first portion 810 and the third portion 814 of the respective preforms 800a and 800b are associated with substantially the same stretch ratio. Within these embodiments, the body portion of the preforms 800a and 800b (not separately numbered) can be associated with substantially the same wall thickness or, in other words, the internal skin of the preform 800a, 800b can mimic the external shape of the preform 800a, 800b.

In alternative embodiments of the present invention, the inside shape of the preforms 800a and 800b can be associated with a standard design (i.e. have an inner annular cylindrical design or, in other words, have an interior circular cross section). Within those embodiments of the present invention, the different stretch ratios attributable to the first portion 810, the second portion 812 and the third portion 814 are attributable to the different wall thickness defined between the outer hexagon or octagon shapes and the inner skin of the preforms 800a and 800b. In yet alternative embodiments of the present invention, the hexagon or octagon shapes can be defined on the inner skin of the preforms 800a and 800b, while the outer skin of the preforms 800a and 800b can be associated with the standard design (i.e. have an exterior circular cross section).

Figure 3B:
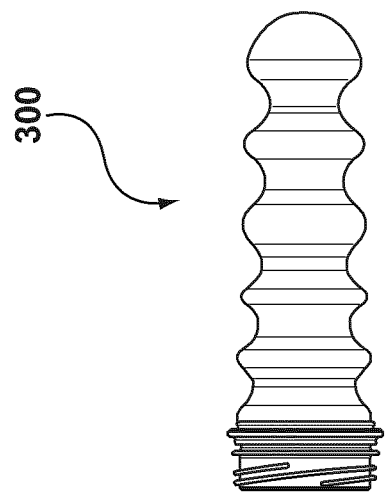
FIG. 3B depicts a side view of the preform of FIG. 3A.
Figure 3A:
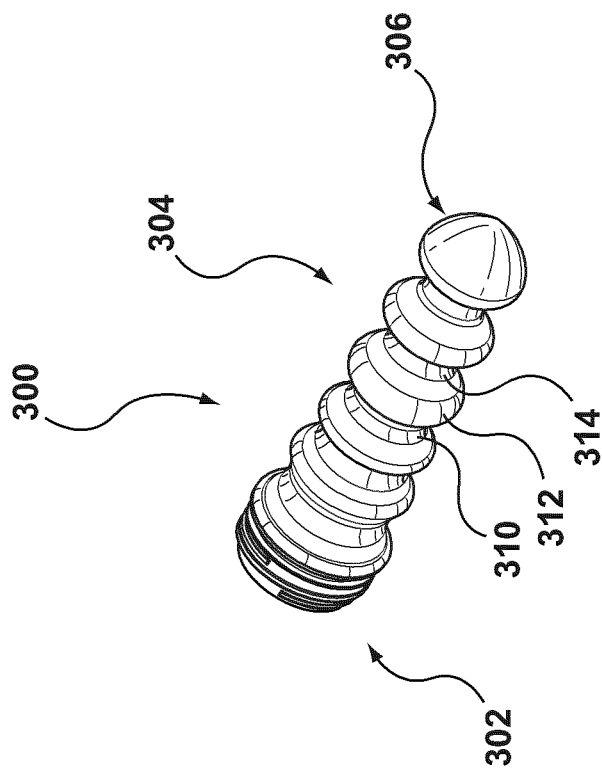

With reference to FIGS. 3A and 3B, there is depicted a preform 300 implemented in accordance with another non-limiting embodiment of the present invention. More specifically, FIG. 3A depicts a perspective view of the preform 300, while FIG. 3B depicts a side view of the preform 300. The preform 300 is suitable for blow-molding into a final-shaped container, such as a bottle for a beverage or the like. The preform 300 consists of a neck portion 302, a gate portion 306 and a body portion 304 extending between the neck portion 302 and the gate portion 306.

Within these embodiments, the body portion 304 can be said to define a first portion 310, a second portion 312 and a third portion 314. As can be appreciated from FIGS. 3A and 3B, the first portion 310, the second portion 312 and the third portion 314 are disposed sequentially one after another along substantially the whole length of the body portion 304. Put another way, the second portion 312 is disposed in-between the first portion 310 and the third portion 314 in the longitudinal direction of the body portion 304. Even though not specifically shown in the FIGS. 3A and 3B, all of the first portion 310, the second portion 312 and the third portion 314 are associated with a substantially same wall thickness (i.e. a thickness of material between an outer skin and an inner skin of the body 304).

According to embodiments of the present invention, the second portion 312 can be implemented as a low-stretch ratio region associated with a different stretch ratio coefficient relative to the first portion 310 and the third portion 314, which in these cases are implemented as high-stretch ratio regions. It is noted that within these embodiments of the present invention, the first portion 310 and the third portion 314 are associated with substantially the same stretch ratio. Recalling that the body portion 304, including the first portion 310, the second portion 312 and the third portion 314, is associated with substantially the same wall thickness, the difference in the stretch ratio is achieved by geometry and positioning of the first portion 310, the second portion 312 and the third portion 314. More specifically, the geometry of the body portion 304 can be said to be associated with a crenated shape in the sense that it is comprised of intermeshed valleys (i.e. the first portion 310 and the third portion 314) and peaks (the second portion 312). For the avoidance of doubt, the term stretch ratio is used in the sense of stretch ratio as it may apply during the stretch-blow molding process, for example, where the preform 300 is re-shaped into the final shaped container.

As can be appreciated from the illustration of FIGS. 3A and 3B, the gate portion 306 is implemented in a generally semi-spherical shape, but this needs not be so in every embodiment of the present invention. In alternative implementation of the embodiments of the present invention, the gate portion 306 can be implemented in a different shape, such for example in a shape of a cone similar to the embodiments of FIGS. 2A, 2B and 2C; as well as other shapes known to those of skill in the art. The exact implementation of the neck portion 302 is not particularly limited and can be based on one of the standards available in the art and will depend on the specific design of the closure (not depicted) used to cap the final-shaped container, as well as certain constraints imposed by the blow-molding equipment (specifically applicable to the design of the support ledge, which is not separately numbered).

As can be clearly appreciated from the illustration of FIG. 3A and FIG. 3B, the first portion 310, the second portion 312 and the third portion 314 are implemented repeatedly in sequence along substantially the whole of the length of the body portion 304. However, it alternative embodiments of the present invention, the first portion 310, the second portion 312 and the third portion 314 can be implemented repeatedly in sequence along a portion of the length of the body portion 304. It is noted that the exact number of occurrences of the first portion 310, the second portion 312 and the third portion 314 is not limited and will depend on specific design choices, such as the size of the preform 300, the specific shape selected for implementing the first portion 310, the second portion 312 and the third portion 314 and other design considerations.

It is noted that during the longitudinal deformation during the stretch blow molding of the preform 300, the second portion 312 will result in more material defined on the final-shaped container, while the first portion 310 and the third portion 314 will result in less material defined on the final-shaped container. This, in turn, results in the portions of the final-shaped container defined by the first portion 310 and the third portion 314 being associated with higher strain rate and, therefore, higher strength.

It is also noted that the specific shape of the first portion 310, the second portion 312 and the third portion 314 is not particularly limited and may be selected based on specific differences between respective stretch ratios as may be desired. For example, even though depicted in FIG. 3B as a general sinusoidal shape, this needs not be so in every embodiment of the present invention. Additional, the specific depth of the peaks valleys, particular radii and the like can be varied in different implementation of the embodiments of the present invention. It is also noted that in some embodiments of the present invention, the first portion 310, the second portion 312 and the third portion 314 (as well as repetitions thereof) can have the same shape therebetween; while in other embodiments, the shape may differ therebetween.

Figure 9:
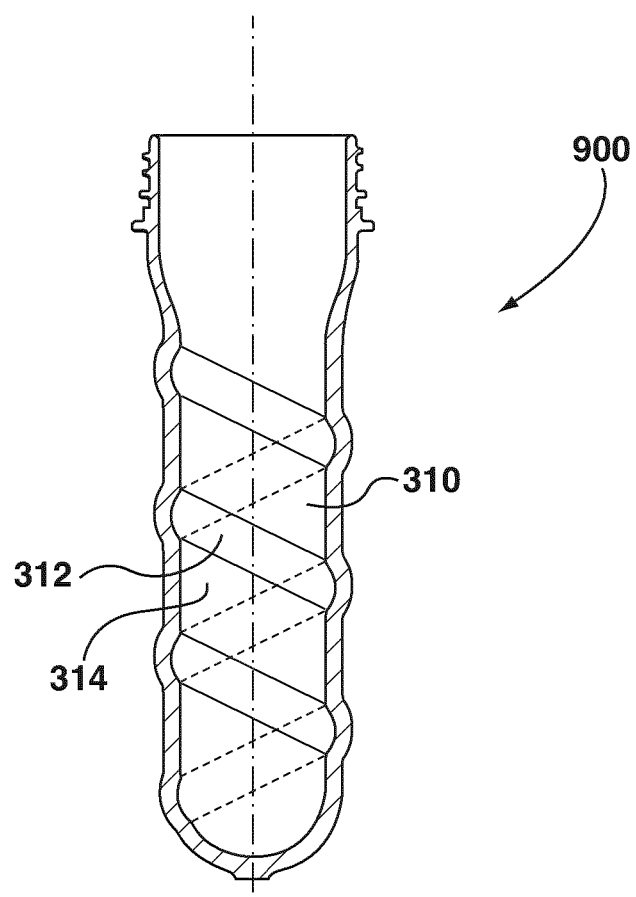
FIG. 9 depicts a side view of a preform with certain hidden features shown in phantom lines, the preform being implemented in accordance with yet another non-limiting embodiment of the present invention.
Figure 10:
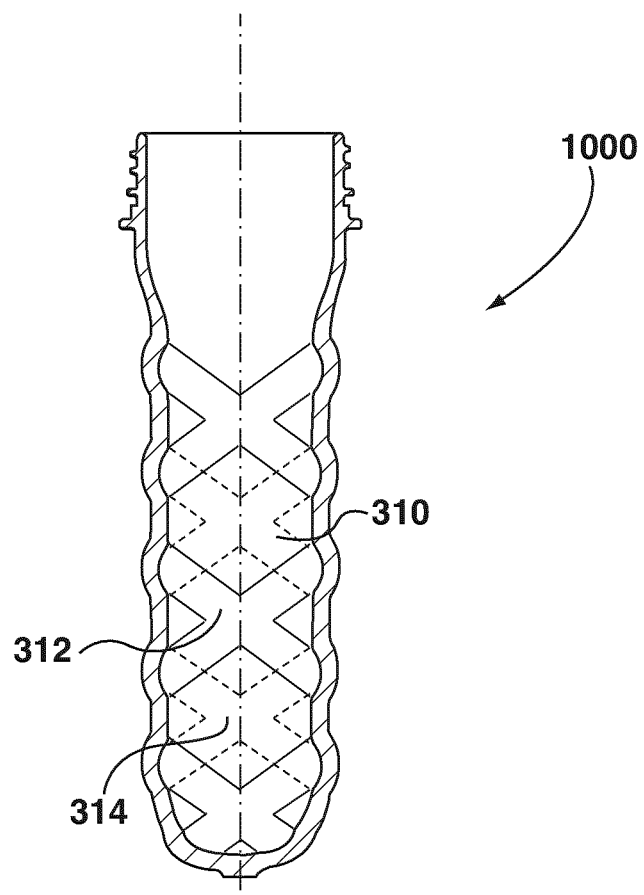
FIG. 10 depicts a side view of a preform with certain hidden features shown in phantom lines, the preform being implemented in accordance with yet another non-limiting embodiment of the present invention.

As an example, another non-limiting implementation for the shape of the preform 300 is depicted with reference to FIG. 9 and FIG. 10. FIG. 9 depicts a side view of a preform 900 implemented in accordance with yet another embodiment of the present invention, the preform 900 illustrating another shape for the first portion 310, the second portion 312 and the third portion 314. FIG. 10 depicts a side view of a preform 1000 implemented in accordance with yet another embodiment of the present invention, the preform 1000 illustrating another shape for the first portion 310, the second portion 312 and the third portion 314. It is noted that preforms 900, 1000 can have substantially the same body thickness or varied body thickness associated with the first portion 310, the second portion 312 and the third portion 314.

With reference to FIGS. 4A, 4B and 4C, there is depicted a preform 400 implemented in accordance with yet another non-limiting embodiment of the present invention. More specifically, FIG. 4A depicts a perspective view of the preform 400, FIG. 4B depicts a side view of the preform 400 with certain hidden features shown in phantom lines and FIG. 4C depicts a cross sectional view of the preform 400 taken along lines A-A of FIG. 4B.

The preform 400 is suitable for blow-molding into a final-shaped container, such as a bottle for a beverage or the like. The preform 400 consists of a neck portion 402, a gate portion 406 and a body portion 404 extending between the neck portion 402 and the gate portion 406.

Within these embodiments, the body portion 404 can be said to define a first portion 410, a second portion 412 and a third portion 414. As can be appreciated from FIGS. 4A, 4B and 4C, the first portion 410, the second portion 412 and the third portion 414 are disposed sequentially one after another along substantially the whole length of the body portion 404. Each of the first portion 410 and the second portion 412, as well as the second portion 412 and the third portion 414 are separated by a respective step 416. It can be appreciated from the illustration of FIG. 4B or 4C that the respective step 416 is defined on both the outside skin side and the inside skin side of the preform 400.

It can be also appreciated from the illustration of FIGS. 4A, 4B and 4C, that all of the first portion 410, the second portion 412 and the third portion 414 are associated with a substantially same wall thickness (i.e. a thickness of material between an outer skin and an inner skin of the body 404).

According to embodiments of the present invention, the first portion 410, the second portion 412 and the third portion 414 are implemented as regions with sequentially increasing stretch ratio. In other words and recalling that all of the first portion 410, the second portion 412 and the third portion 414 are associated with the same wall thickness, the stretch ratio associated the first portion 410, the second portion 412 and the third portion 414, the difference in the stretch ratio is achieved by positioning of the first portion 410, the second portion 412 and the third portion 414. More specifically, it can be said that during stretch-blow-molding, the second portion 412 will have to travel further, in a radial direction, than the first portion 410. By the same token, the third portion 414 will have to travel further, in a radial direction, than the first portion 410 and the second portion 412. For the avoidance of doubt, the term stretch ratio is used in the sense of stretch ratio as it may apply during the stretch-blow molding process, for example, where the preform 400 is re-shaped into the final shaped container.

As can be appreciated from the illustration of FIGS. 4A, 4B and 4C, the gate portion 406 is implemented in a shape of a cone, but this needs not be so in every embodiment of the present invention. In alternative implementation of the embodiments of the present invention, the gate portion 406 can be implemented in a different shape, such as a typical semi-spherical shape or the like. The exact implementation of the neck portion 402 is not particularly limited and can be based on one of the standards available in the art and will depend on the specific design of the closure (not depicted) used to cap the final-shaped container, as well as certain constraints imposed by the blow-molding equipment (specifically applicable to the design of the support ledge, which is not separately numbered).

As can be clearly appreciated from the illustration of FIG. 4A, FIG. 4B and FIG. 4C, the first portion 410, the second portion 412 and the third portion 414 are implemented repeatedly in sequence along substantially the whole of the length of the body portion 404. It is noted that the exact number of occurrences of the first portion 410, the second portion 412 and the third portion 414 is not limited and will depend on specific design choices. Same applied to the number of associated respective steps 416, such as the size of the preform 400, the specific shape selected for implementing the first portion 410, the second portion 412 and the third portion 414 and other design considerations. In alternative non-limiting embodiments of the present invention, the repetitions of the first portion 410, the second portion 412 and the third portion 414 can be implemented over a portion of the body portion 404.

With reference to FIG. 5A and FIG. 5B, there is depicted a preform 500 implemented in accordance with yet another non-limiting embodiment of the present invention. More specifically, FIG. 5A depicts a side view of the preform 500 with certain hidden features shown in phantom lines and FIG. 5B depicts a cross sectional view of the preform 500 taken along lines A-A of FIG. 5A.

The preform 500 is suitable for blow-molding into a final-shaped container, such as a bottle for a beverage or the like. The preform 500 consists of a neck portion 502, a gate portion 506 and a body portion 504 extending between the neck portion 502 and the gate portion 506.

Within these embodiments, the body portion 504 can be said to define a first portion 510, a second portion 512 and a third portion 514. As can be appreciated from FIGS. 5A and 5B, the first portion 510, the second portion 512 and the third portion 514 are disposed sequentially one after another along substantially the whole length of the body portion 504. Each of the first portion 510 and the second portion 512, as well as the second portion 512 and the third portion 514 are separated by a respective step 516. It can be appreciated from the illustration of FIG. 5A or 5B that the respective step 516 is defined on both the outside skin side and the inside skin side of the preform 500.

It can be also appreciated from the illustration of FIG. 5A and FIG. 5B, that the first portion 510, the second portion 512 and the third portion 514 are associated with progressively increasing wall thickness (i.e. a thickness of material between an outer skin and an inner skin of the body 504).

According to embodiments of the present invention, the first portion 510, the second portion 512 and the third portion 514 are implemented as regions with sequentially decreasing stretch ratio. In other words and recalling that the first portion 510, the second portion 512 and the third portion 514 are associated with the progressively increasing wall thickness, the difference in the stretch ratio is achieved by means of varying wall thickness of the first portion 510, the second portion 512 and the third portion 514. For the avoidance of doubt, the term stretch ratio is used in the sense of stretch ratio as it may apply during the stretch-blow molding process, for example, where the preform 500 is re-shaped into the final shaped container.

As can be appreciated from the illustration of FIG. 5A and FIG. 5B, the gate portion 506 is implemented in a shape of a cone, but this needs not be so in every embodiment of the present invention. In alternative implementation of the embodiments of the present invention, the gate portion 506 can be implemented in a different shape, such as a typical semi-spherical shape or the like. The exact implementation of the neck portion 502 is not particularly limited and can be based on one of the standards available in the art and will depend on the specific design of the closure (not depicted) used to cap the final-shaped container, as well as certain constraints imposed by the blow-molding equipment (specifically applicable to the design of the support ledge, which is not separately numbered).

As can be clearly appreciated from the illustration of FIG. 5A and FIG. 5B, the first portion 510, the second portion 512 and the third portion 514 are implemented repeatedly in sequence along substantially the whole of the length of the body portion 504. It is noted that the exact number of occurrences of the first portion 510, the second portion 512 and the third portion 514 is not limited and will depend on specific design choices. Same applied to the number of associated respective steps 516, such as the size of the preform 500, the specific shape selected for implementing the first portion 510, the second portion 512 and the third portion 514 and other design considerations. In alternative non-limiting embodiments of the present invention, the repetitions of the first portion 510, the second portion 512 and the third portion 514 can be implemented over a portion of the body portion 504.

Generally speaking, what has been described above is a preform suitable for blow-molding into a final-shaped article. The preform includes a neck portion; a gate portion; and a body portion extending between the gate portion and the neck portion. The body portion defines a first portion, a second portion and a third portion, the second portion being disposed in-between the first portion and the third portion located in sequence along one of: (i) substantially the whole circumference of the body portion and (ii) substantially the whole length of the body portion; one of the first portion, second portion and the third portion having a stretch ratio different that at least one of the other ones of the first portion, the second portion and the third portion. The differences in the stretch ratio can be attributable to the geometry or the spatial placement (such as in case of the preform 200, 300, 400, 800a, 800b, 900, 1000); or alternatively to the wall thickness, such as in case of the preform 500 or alternative implementation of the preforms 800a and 800b or some implementations of preform 900, 1000.

Figure 7:
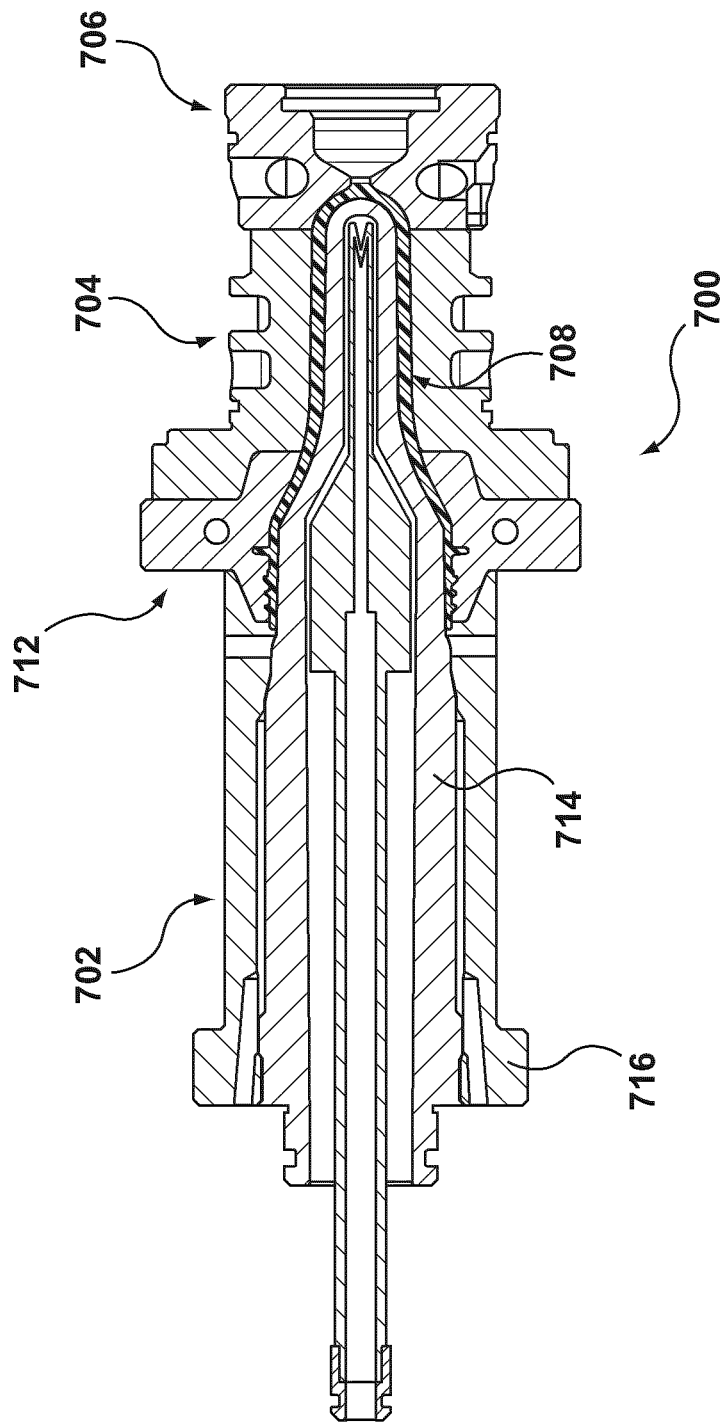
FIG. 7 depicts a cross sectional view of a portion of a molding stack that can be adapted to implement embodiments of the present invention.

As is known in the art, the preforms 200, 300, 400, 500, 800a, 800b described above can be produced using known mold stack components with certain modifications, as will be described below. As is known in the art, the preforms can be defined by a mold stack, an example of which is depicted with reference to FIG. 7, which depicts a cross section of a portion of a molding stack 700 that can be used to implement embodiments of the present invention. More specifically, the molding stack 700 comprises a core insert 702, a cavity insert 704, neck rings 712 and a gate insert 706. The core insert 702, the cavity insert 704, the neck rings 712 and the gate insert 706 cooperate, in use, to define together a molding cavity 708. Shape of the molding cavity 708 corresponds to a shape of a molded article to be molded Also depicted in FIG. 7 are a number of additional components, such as, cooling channels (not separately numbered), etc. All of these additional components are known to those of skill in the art and, as such, will not be described here at any length.

The core insert 702 comprises a core base 714 and a retaining member 716. The retaining member 716 is configured to lock, in an operational configuration, the core base 714 to a core plate (not depicted).

It should be noted that FIG. 7 depicts just one non-limiting example of the molding stack 700 that can be used to implement embodiments of the present invention. It should be noted that in alternative non-limiting embodiments of the present invention, the molding stack 700 may have other configurations. For example, the gate insert 706 may be omitted and the cavity insert 704 and the core insert 702 may define a substantially whole portion of a body of the molded article to be molded. In other non-limiting embodiments of the present invention, the core insert 702 and/or the cavity insert 704 and/or the gate insert 706 do not need to be inserts per se. In other words, the core insert 702 and/or the cavity insert 704 and/or the gate insert 706 can be implemented as integral members of a core plate (not depicted) and a cavity plate (not depicted). Other alternative implementation, are of course, also possible.

According to embodiments of the present invention, some of the preforms 200, 300, 400, 500, 800a, 800b can be manufactured using this standard molding stack 700 and modified during a post-mold reshaping process. For example, preform 200 and preform 300 can be manufactured using this standard molding stack 700 and can be modified using a post-mold reshaping process, such as post-swaging process described in more detail in the U.S. Pat. No. 7,138,082 issued to Nahill et al on Nov. 21, 2006 or US patent application bearing a publication number 2005/0139569 published on Jun. 30, 2005 to Larsen et al, teaching of both of these references being incorporated herein by reference in their entirety. Alternatively or additionally, some of the preforms 200, 300, 400 can be reshaped by applying negative pressure (i.e. vacuum), as for example in a PCT patent application bearing a publication number WO 03/086728 published on Oct. 23, 2003 to Pesavento, teaching of which are incorporated by reference in their entirety.

According to other embodiments of the present invention, some of the preforms 200, 300, 400, 500 can be manufactured using the molding stack 700 with certain modifications to the molding stack 700 itself.

For example, according to embodiments of the present invention, it is contemplated that the preform 200 can be manufactured by the molding stack 700, with the molded article defining geometry of the core insert 702, the cavity insert 704 and the neck rings 712 being modified to mold the geometry of the crenated shape of the preform 200. Since the crenated geometry of the preform 200 in longitudinally extending, no issues with de-molding are anticipated.

According to embodiments of the present invention, it is contemplated that the preform 300 can be manufactured by the molding stack 700, with the following modifications. The core insert 702 can modified as a "collapsible core", as for example is described in US patent application bering a publication number 2007/0098831 published on May 3, 2007 to Yoon or U.S. Pat. No. 3,247,548 issued to Fields et al on Apr. 26, 1966 for defining and de-molding of the interior skin of the preform 300. The neck rings 712 and the cavity insert 704 can be modified to be implemented as a single large split mold insert, such as for example described in a Japanese patent 54-133554 published on Apr. 10, 1978.

According to embodiments of the present invention, it is contemplated that the preform 400 can be manufactured by the molding stack 700, with the molded article defining geometry of the core insert 702, the cavity insert 704 and the neck rings 712 being modified to mold the geometry of the shape of the preform 400 and more specifically, to define the steps 416. Since the geometry of the preform 400 in longitudinally extending, no issues with de-molding are anticipated. Similar considerations for molding and de-molding apply to preforms 500, 800a and 800b.

According to embodiments of the present invention, there is also provided a method of design a geometry of a preform. The method can be conveniently executed at a computing apparatus (not depicted), such as a general purpose computer or any other suitable general-purpose or purpose-specific processor.

The method of designing a preform will be described with reference to FIGS. 6A and 6B, which illustrate schematically the images loaded in the above-mentioned computing apparatus and illustrate the process of designing the preform. FIG. 6B depicts a side view and FIG. 6A depicts a perspective view of the images being uploaded and processed by the above-mentioned computing apparatus.

Generally speaking, the method of designing the preform includes:

Step A

Uploading a design of a final shaped container to be molded from the preform. More specifically, a desired design of the final shaped container 602 is loaded. The desired design can be loaded, for example, from a file provided by a customer of the vendor of the equipment to manufacture a preform 604 that can be used to produce the final shaped container 602.

Step B

Selecting a plurality of reference points on the final shaped container.

Next a plurality of reference points on the final shaped container 604 are selected. More specifically, the plurality of reference points is selected along the body portion of the final shaped container 604. The number of the reference points so-selected is not particularly limited and will depend on the specific shape of the final shaped container 604. In a specific implementation of the embodiments of the present invention, the number of the plurality of reference points is selected such as to allow a homothetic transformation of all significant elements of the final shaped container 604.

Step C

Applying the same stretch ratio to the plurality of reference points to render a plurality of preform reference points.

Next, a plurality of preform reference points are generated by applying the same stretch ratio to the plurality of reference points generated as part of Step B, in a sense, rendering a plurality of preform reference points. Put another way, the plurality of reference points defined on the final shaped container 604 defined in Step B have undergone a homothetic transformation to render the plurality of preform reference points by applying a constant stretch ration coefficient to the plurality of reference points defined on the final shaped container 604.

Step D

Based on the plurality of preform reference points, rendering a preform design for the preform.

Finally, based on the so-generated plurality of preform reference points generated as part of step C, the preform design of the preform 604 is effectively rendered. It is worthwhile noting that, depending on the shape of the final shaped container 602 desired, the resultant preform 604 may have a constant or varying wall thickness.

Generally, speaking, it can be said that the method of designing a preform is characterized by the fact that the design of the preform starts with the design of the final shaped container and is rendered by applying a constant stretch ratio to the plurality of reference points on the final shaped container.

A technical effect of embodiments of the present invention may include provision of a preform which is associated with a lower weight compared to the prior art preform design. Additionally or alternatively, the embodiments of the present invention may result in a preform which has specific geometries in specific desired regions of the preforms that impact the mechanical properties of the bottle.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described.

Therefore, what is to be protected by way of letters patent are limited only by the scope of the following claims:

1. A preform suitable for blow-molding into a final-shaped article, the preform comprising:
 a neck portion;
 a gate portion; and
 a body portion extending between the gate portion and the neck portion; the body portion defining:
  a first portion, a second portion and a third portion, the second portion being disposed in-between the first portion and the third portion located in sequence along at least a portion of a circumference of the body portion; all three portions having substantially the same wall thickness;
  the second portion being implemented as a high-stretch ratio region associated with a different stretch ratio coefficient relative to the first and third portions; and
 wherein the first portion, the second portion and the third portion constitute crenated geometry of the body portion, which is associated with substantially sinusoidal shape defined on an inner skin and an outer skin thereof.

2. The preform of claim 1, wherein the first and third portions are associated with substantially the same stretch ratio coefficient.

3. The preform of claim 1, wherein the first portion, the second portion and the third portion are located in sequence along the entirety of the circumference of the body portion.

* * * * *